United States Patent Office 3,684,429
Patented Aug. 15, 1972

3,684,429
PROCESS OF SHRINKPROOFING WOOL WITH EPOXY CARBAMATES AND A POLYAMINE
Giuliana C. Tesoro, Dobbs Ferry, N.Y., and Wing Kai Lee, Hackensack, N.J., assignors to J. P. Stevens & Co., Inc., New York, N.Y.
No Drawing. Original application May 22, 1967, Ser. No. 640,397. Divided and this application Mar. 5, 1970, Ser. No. 26,451
Int. Cl. D06m 13/38
U.S. Cl. 8—127.6
11 Claims

ABSTRACT OF THE DISCLOSURE

This invention concerns novel epoxyalkyl carbamates of the structure:

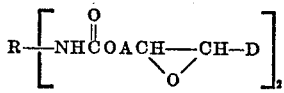

wherein

A is a divalent alkylene radical selected from the group consisting of straight-chain alkylene radicals and branched-chain alkylene radicals, D is selected from the group consisting of hydrogen and alkyl radicals, and R is a divalent organic radical of at least 12 carbon atoms selected from the group consisting of
(a) linear polymers terminated on both ends of arylenecarbamoyl radicals

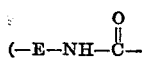

where E is arylene), and
(b) hydrocarbon radicals.

The compositions of this invention are useful for the dimensional stabilization of proteinaceous substrates such as wool.

---

The present application is a divisional of application Ser. No. 640,397, filed May 22, 1967, now abandoned.

This invention relates to novel polyfunctional epoxides useful as finishing agents and as intermediates for preparing finishing agents.

More particularly, this invention concerns novel epoxyalkyl carbamates of the structure:

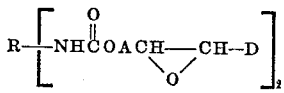

wherein

A is a divalent alkylene radical selected from the group consisting of straight-chain alkylene radicals and branched-chain alkylene radicals, D is selected from the group consisting of hydrogen and alkyl radicals, and R is a divalent organic radical of at least 12 carbon atoms selected from the group consisting of
(a) linear polymers terminated on both ends by arylenecarbamoyl radicals

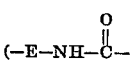

where E is arylene), and
(b) hydrocarbon radicals.

These products, particularly those where R is

wherein G is a dimerized fat radical of at least 12 carbon atoms, are useful as dimensional stabilizers for proteinaceous substrate such as wool.

Proteinaceous fibers as exemplified by wool have several advantageous properties which make them valuable in article or garment fabrication. These properties include good thermal insulation, good resilience, fit, durability, wrinkle resistance and good receptivity to dyeing. Unfortunately, the untreated wool fibers and fabrics manufactured from wool are rather sensitive to extended contact with water such as is experienced during normal laundering procedures. As a result of exposure to water, woolen textiles shrink and felt, and their use for certain textile applications has been severely restricted.

Within recent years a major amount of research has been undertaken to improve the dimensional stability of wool and other proteinaceous substrates. Desirably, dimensional stabilizers in addition to performing their prime function of shrinkproofing, would be inexpensive to apply, could be applied by non-technically trained labor, using conventional textile treating equipment and the treated fiber or fabric would be resistant to repeated normal launderings. The development of reagents possessing this combination of properties would represent a useful advance in the art.

It is an object of this invention, among others, to prepare novel products useful in improving the dimensional stability of proteinaceous fibers and fabrics such as wool.

Another object of this invention is the preparation of homopolymers and copolymers of the above epoxide products which are useful as coatings and finishing agents.

Additional objects will become apparent to those skilled in the art after a perusal of this application.

In practice, a divalent organic diisocyanate reactant whose generic formula can be represented by:

wherein

R is defined as described infra, is contacted with an epoxyalkanol generically represented as:

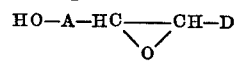

wherein

A is a divalent alkylene radical selected from straight-chain and branched chain alkylene radicals containing from 1 to 8 carbon atoms, D is selected from the group consisting of hydrogen and monovalent alkyl radicals of from 1 to 8 carbon atoms, under reaction conditions (time, temperature, pressure, solvents, ratio of reactants, etc.) sufficient to produce the afore-defined epoxy products of this invention, and isolating the products contained therein.

The diisocyanate reactants of the invention can be generically represented by the structure:

wherein

R is a divalent organic radical containing at least 12 carbon atoms selected from two classes of radicals:
(a) hydrocarbon radicals, and
(b) linear polymers terminated on both ends by arylenecarbamoyl radicals

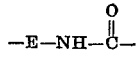

wherein E is arylene such as phenylene, methylphenylene, and dimethylphenylene.

The hydrocarbon radicals which comprise the first class (a) are preferably aliphatic or cycloaliphatic radicals derived by polymerizing a saturated or unsaturated fat acid having 8 to 24 carbon atoms. The preparation of fat acids is disclosed in British Pat. 1,023,390, published Mar. 23, 1966. As indicated in the patent, the term "fat acids" includes naturally occurring or synthetic saturates, ethylenically unsaturated and acetylenically unsaturated acids. The term polymeric fat radical is generic to the divalent, trivalent and polyvalent radicals of dimerized, trimerized and higher polymers of fat acids. The preferred reactants are those in which the radical R is

wherein G is a dimerized fat radical of at least 12 carbon atoms.

The second class of values (b) that the radical R can assume in the above formula comprises: linear polymers terminated on both ends by arylenecarbamoyl radicals

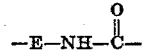

wherein the symbol E is arylene. This class can be more clearly expressed symbolically within the structure:

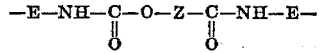

wherein

E is an arylene radical, and
Z is selected from the group consisting of:

(1) polyalkyleneoxy or polyoxyalkylenes

wherein p ranges between 3 and 6 inclusive, and
n ranges between 2 and 200 inclusive, (2) the chain of a linear polyester

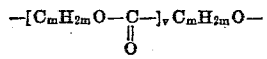

wherein m ranges between 2 to 10 inclusive, and
v ranges between 2 and 80 inclusive, (3) the oxygen-terminated chain of a polymer of an alkadiene such as a chain of a polymer of 1,4-butadiene, $\{CH_2CH\text{---}CHCH_2\}_uO$,
wherein u ranges between 55 and 65 inclusive.

Illustrative epoxyalkanols which can be utilized as coreactants with the diisocyanates are as follows:

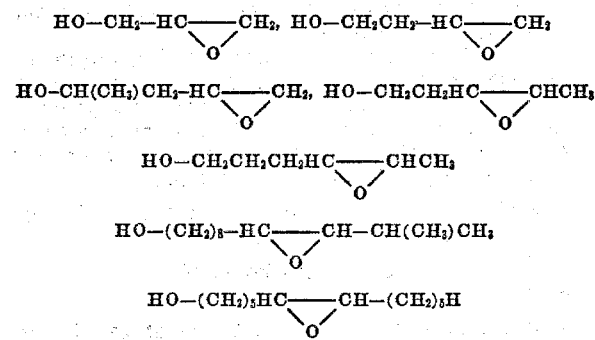

and the like.

The preferred epoxyalkanol reactants are 2,3-epoxy-1-propanol, 2,3-epoxy-1-butanol, 3,4-epoxy-1-butanol, the epoxy-1-pentanols and epoxy-1-hexanols.

The reaction conditions used to produce the novel epoxy products of this invention are not critical and closely resemble those utilized in the reaction of alkanols with diisocyanates in organic chemistry. Ordinarily, inert solvents such as the halogenated hydrocarbons are utilized, and temperatures between about 20° C. and 75° C. are ordinarily employed. Near stoichiometric proportions of reactants are used and ordinarily the reactions are run at atmospheric or near atmospheric pressure although the solvents are commonly stripped off under reduced pressure. The reaction time varies according to the reactants employed and the temperature at which the reaction is run and therefore cannot be stated precisely. However, at temperatures of about 20–35° C. most reactions are complete within 4 to 24 hours. Longer times are not harmful.

While all of the afore-described epoxyalkyl carbamates are useful as finishing agents or as intermediates useful in preparing finishing agents, as in any large group, certain members of the group are to be preferred to the group as a whole. In this instance, the preferred members are epoxyalkyl carbamates of the formula:

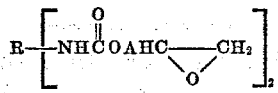

wherein

R is —$CH_2GCH_2$—, wherein G is a dimeric fat radical of 14 to 48 carbon atoms, and
A is an alkylene radical containing from 1 to 4 carbon atoms.

These compounds are preferred because they form particularly effective finishing compositions when combined with polyamine co-treating agents such as diethylenetriamine, triethylene-tetramine, tetraethylene-pentamine and the like, in equivalent weight ratios ranging from 2:1 to 1:5. The mixtures not only are inexpensive, but give more efficacious results than do the epoxyalkyl carbamate reagents alone.

The products are durable dimensional stabilizers for wool and can be prepared in good yield under moderate reaction conditions from inexpensive starting materials.

To better illustrate the workings of this invention in more detail, the following preparation and application examples are submitted. In all instances, amounts shown are in parts by weight unless otherwise noted.

EXAMPLE 1

Preparation of a reactive polyfunctional epoxide produced by the addition of 2,3-epoxy-1-propanol to a diisocyanate derived from toluene diisocyanate and polytetramethylene ether glycol First Stage:

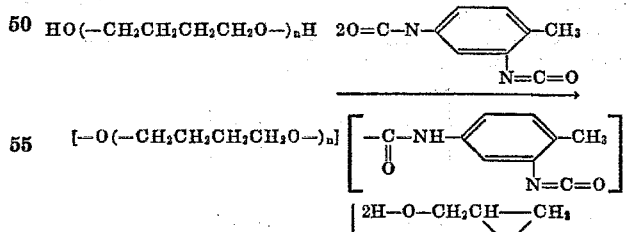

Second Stage:

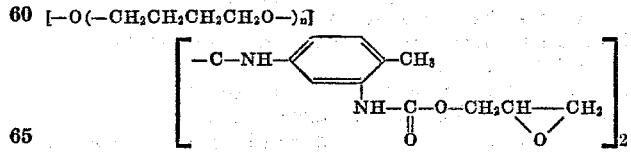

DESCRIPTION OF STARTING MATERIALS

The polytetramethylene ether glycol used as a reactant is a commercial grade produced from tetrahydrofuran; molecular weight 1000±50 (hence n has an average value of 13.6±0.7); hydroxyl number 112.5±3.5; waxy solid melting at 35 to 40° C.

The toluene diisocyanate reactant is a commercial grade having an 80/20 ratio of "2,4" and "2,6" isomers.

First stage

Toluene diisocyanate (187.5 grams, 0.5 mole) is added dropwise to a stirred solution of 202 grams (0.2 mole) of polytetramethylene ether glycol in 200 grams of dichloromethane at room temperature while nitrogen is bubbled through the solution. After the addition is complete the solution is stirred at 30° C. under nitrogen for 9.5 hours. The infrared spectrum of the resulting reaction mixture is devoid of the absorption band characteristic of hydroxyl, thus indicating completion of the desired reaction.

Second stage

In order to convert the isocyanate-terminated polymer to linear macromolecules terminated on both ends with epoxy groups, the reaction product described above is added slowly to 32.6 grams (0.44 mole) of 2,3-epoxy-1-propanol dissolved in 100 grams of dichloromethane at room temperature.

After completion of the addition, the reaction mixture is stirred for 5 additional hours at room temperature. Then solvent was distilled off under reduced pressure at room temperature. The product has an oxirane content of 5.04%. (The theoretical maximum oxirane content is 5.7% for the diepoxide.)

EXAMPLE 2

Preparation of the reactive polyfunctional epoxide produced by the addition of 2,3-epoxy-1-propanol to a diisocyanate derived from dimerized $C_{18}$ unsaturated fatty acids

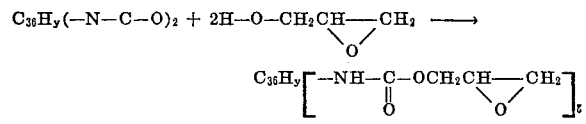

A commercial grade of diisocyanate obtained from dimerizing $C_{18}$ unsaturated fatty acids described in British Pat. 1,023,390, published Mar. 23, 1966, is used as the $C_{36}$ diisocyanate. The average value of $y$ in the formulas shown above is approximately 66. The material has 14% —N=C=O, less than 0.1% hydrolyzable chloride, an assay of at least 98% and a viscosity at 20° C. of 170 centipoises. A solution consisting of 240 grams (0.4 mole) of the diisocyanate and 100 grams of benzene is added dropwise at room temperature to a stirred solution of 65 grams (0.88 mole) of 2,3-epoxy-1-propanol in 100 grams of benzene. After completion of the addition, the reaction mixture is stirred at room temperature for 5 hours, then allowed to stand at room temperature overnight. At the end of this time the solvent and excess 2,3-epoxy-1-propanol are evaporated off at room temperature under reduced pressure to yield a product having an oxirane content of 2.65 milliequivalents per gram. (The theoretical maximum oxirane content for the reactive diepoxide is 2.68 milliequivalents per gram.)

EXAMPLE 3

Preparation of the reactive polyfunctional epoxide produced by the addition of 2,3-epoxy-1-propanol to a diisocyanate derived from a linear polyester A solution composed of 100 grams (0.226 equivalent) of an industrial grade of an isocyanate-terminated linear polyester (having the structure given above, wherein $m$ is about 6, and $v$ averages between 3 and 4) and 100 grams of dichloromethane is added dropwise at room temperature to a stirred solution of 18.3 grams (0.248 mole) of 2,3-epoxy-1-propanol in 50 grams of dichloromethane. After completion of the addition, the reaction mixture was stirred at room temperature for 5 hours and the solvent and excess 2,3-epoxy-1-propanol are distilled off under reduced pressure. The product has an oxirane content of 1.83 milliequivalents per gram. (The theoretical maximum oxirane content is 1.91 milliequivalents per gram for the diepoxide.)

EXAMPLE 4

Preparation of the reactive polyfunctional epoxide produced by the addition of 2,3-epoxy-1-propanol to a diisocyanate derived from toluene diisocyanate and a polymer of butadiene First Stage:

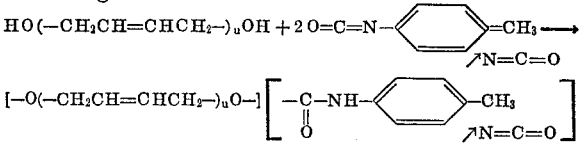

Second Stage:

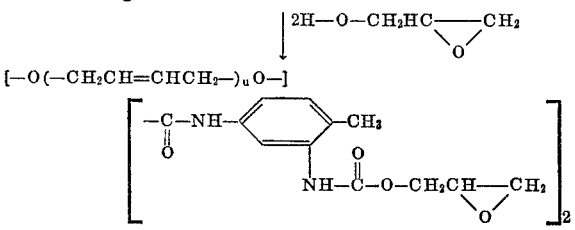

First stage

The hydroxyl-terminated polybutadiene used as starting material is a technical grade having a hydroxyl content of 0.80 milliequivalent per gram, an iodine number of 395, and an average molecular weight of 3250±250. The degree of polymerization, $u$ ranges between 55 and 65 inclusive.

The following procedure is used to convert the hydroxyl-terminated polybutadiene into essentially linear macromolecules terminated on both ends with isocyanate groups. A 2-liter, 3-neck flask equipped with a stirrer, a thermometer, a gas inlet tube, and a dropping funnel is charged with 200 grams of the hydroxyl-terminated polybutadiene dissolved in 200 grams of dichloromethane. Toluene diisocyanate (43.6 grams, 0.25 mole of "2,4" and "2,6" isomers in the ratio of 8/20) is added slowly while a stream of nitrogen is passed into the solution and the temperature is maintained at 20° C. After completion of the addition, the solution is stirred at 25 to 28° C. for 8 hours.

Second stage

To the above stirred solution of intermediate produced in the first stage (namely the diisocyanate derived from a polymer of 1,4-butadiene) is added dropwise a stoichi-

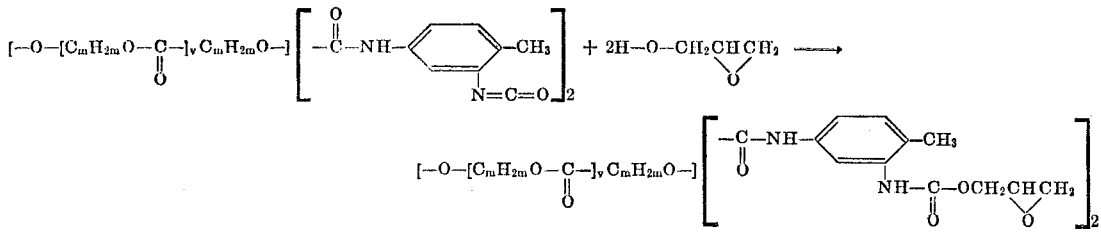

ometrically sufficient quantity of 2,3-epoxy-1-propanol contained in dichloromethane solvent to form a product corresponding to the structure below. The reaction conditions and isolation procedure is comparable to that employed in Examples 1 to 3.

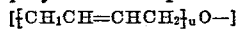

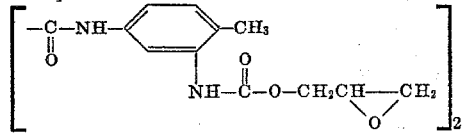

wherein the average value of $u$ ranges between 55 and 65 inclusive.

The dimensional stabilizing agents of this invention can be applied to the proteinaceous substrate by a number of conventional application methods well known in the textile art. These include, but are not limited to padding, brushing, spraying, coating and the like. The agents can be in the form of solutions, slurries, suspensions, emulsions or the like, where appropriate; the main requirement being that at least a stabilizing amount of reagent is deposited on the proteinaceous textile substrate to be treated. A stabilizing amount is that quantity of reagent required to minimize dimensional changes from taking place in the wet-laundered proteinaceous material. Because of experimental variables, differences from reagent to reagent and the particular effect sought, a stabilizing amount cannot be stated with precision. However, in most instances this "amount" ranges between 0.5–10% by weight of reagent based upon the weight of treated substrate, the upper limit being governed by economic considerations. Ordinarily, it is convenient to utilize an inert solvent where solutions are employed. The choice of solvent is not critical as long as it possesses good solubilizing characteristics and it is devoid of reactive hydrogens or other groups which could react with the oxirane groups. Illustrative inert solvents include tertiary amides such as N,N - dimethylformamide, N,N - dimethylacetamide, 1-methyl - 2 - pyrrolidinone, 1,5 - dimethyl-2-pyrrolidinone, cyclic ethers such as the dioxanes and trioxanes, aliphatic ethers such as $$CH_3OCH_2CH_2OCH_3$$

and sulfoxides such as dimethyl sulfoxide.

A convenient mode of application is padding. In this procedure the textile is impregnated with a solution of the reagent in inert solvent, the rolls of the padder being set to the desired wet pickup. The treated textile is dried, usually between about 40° C. to 85° C. and cured above 100° C. The cured, dried samples are usually moisture conditioned to the desired moisture content by exposing them to an appropriate humidity level.

In addition to the dimensional stabilizing reagents of this invention, the padding bath can contain one or more various optional textile adjuvants such as softeners, conditioners, surfactants and the like. Since these reagents are not critical to the success of this invention, no attempt is made to enumerate the various adjuvants that can be employed. It will suffice to say exhaustive lists of these can be found in the technical and patent literature.

Evaluation test methods

Dry cleaning.—Durability test: Used commercial equipment formulation.

Flex abrasion resistance.—In cycles: ASTM D–1175–61T; 0.5-pound head weight and 2-pound toggle tension on Stoll Flex Abrader.

Laundering method for washable woolens.—First, swatch was conditioned for at least 4 hours (relative humidity at 65±2%, 21±1° C.), and markings were applied 10 inches apart. Then: laundered in home-type machine; full water level; 5-pound load; FAB or TIDE detergent; 15-minute wash at 40° C.; running suds 1.5 to 2 inches; automatic rinse; dried flat on horizontal screen; flat-bed pressing at 135 to 149° C. for 5 seconds without steam; reconditioned for at least 4 hours and re-measured.

The number of cycles (as 0, 1 or 10) of laundering and tumble drying is indicated by No. L, 1L, or 10L, respectively.

Shrinkage in laundering in percent.— See "Laundering Method for Washable Woolens," above.

Stiffness test results in milligrams per centimeter; ASTM D1388–55T Cantilever Method.

Parts and percentages were by weight, unless otherwise noted.

Abbreviations in tables.—When used individually, F means filling direction, and W means warp direction. Note the special meanings of the following 3-letter abbreviations:

OWB.—On the weight of the bath. The term is applied when expressing the concentration (%) of an ingredient in the liquid mixture used for impregnating samples of fabric.

OWF.—On the weight of fiber (or fabric), i.e., based on the weight of fabric prior to padding. The percentage of a reagent OWF means the add-on of solids expressed in percent on the dry basis.

WPU.—Wet pickup, i.e., the wet add-on (usually expresed in percentage OWF) which is the gain from solution penetrating the fabric, measured immediately after padding. As used herein, padding consists of the dual process of impregnating the fabric by passing it through a pad bath and then passing the wet fabric through squeeze rollers or wringers.

When expressed in percent, the foregoing terms are related as follows: (% OWB) multiplied by (% WPU)/100%=(% OWF).

EXAMPLE 5

Application of the diepoxide of Example 2 to wool, followed by evaluation of flex abrasion, stiffness, and shrinkage in laundering Samples of 100% wool fabric (6.15 ounces per square yard in a plain weave) are conditioned with the relative humidity at 65±2% (21±1° C.) and weighed on an analytical balance. The samples are padded with various concentrations of the diepoxide of Example 2 in solvent consisting of toluene and N,N-dimethylformamide (1:1), with tetraethylenepentamine also present in the percentages shown on the following table. The wet pickup ranges from 115 to 120%. The wet samples are dried at 50 to 60° C., then cured for 5 minutes at 135° C. Next, the samples are rinsed in toluene, in p-dioxane, and washed thoroughly in water. The dried samples are conditioned with the relative humidity at 65% and the conditioned samples weighed on an analytical balance to determine weight gains. Data on both treatment and evaluation are in the following table:

| Sample | OWB, percent | | WPU, percent | OWF, percent | Actual weight gain, percent | Flex abrasion resistance, cycles | Stiffness, mg./cm. | Shrinkage in laundering, percent | | | |
|---|---|---|---|---|---|---|---|---|---|---|---|
| | Diepoxide of Ex. 2 | Tetraethylene pentamine | | | | | | 1 wash | | 10 washes | |
| | | | | | | | | W | F | W | F |
| A | 5.0 | 1.52 | 120 | 6.00 | 8.33 | 1,150 | 1,235 | 1.0 | 1.0 | 1.0 | 1.5 |
| B | 4.0 | 1.21 | 120 | 4.80 | 7.15 | 1,300 | 1,115 | 1.0 | 1.0 | 1.5 | 1.5 |
| C | 3.0 | 0.91 | 116 | 3.48 | 5.51 | 1,075 | 960 | 1.0 | 1.5 | 1.0 | 1.5 |
| D | 2.0 | 0.60 | 115 | 2.30 | 3.59 | 1,075 | 740 | 1.5 | 1.0 | 2.0 | 1.5 |
| E | 1.0 | 0.30 | 118 | 1.18 | 2.09 | 1,025 | 430 | 2.5 | 2.0 | 3.0 | 3.5 |

EXAMPLE 6

Application of the diepoxide of Example 2 to wool: further variations on Example 5

Samples of 100% wool fabric (6.15 ounces per square yard in a plain weave) are treated similarly to those of Example 5, according to the variations evident in the following table, which includes data on both treatment and evaluation.

| | OWB, percent | | | | | | Flex abrasion resistance, cycles to rupture (W., No. L.) | Shrinkage in laundering, percent | | | |
|---|---|---|---|---|---|---|---|---|---|---|---|
| | | | | | | Actual | | 1 wash | | 10 washes | |
| Sample | Diepoxide of Ex. 2 | Tetra-ethylene-pentamine | WPU, percent | OWF, percent | Cure temp., °C. | weight gain, percent | | W | F | W | F |
| C1 | 7.0 | 0.71 | 114 | 7.98 | 135 | 10.3 | 870 | None | 0.5 | 1.5 | 1.5 |
| C2 | 7.0 | 0.71 | 114 | 7.98 | 163 | 10.2 | 825 | 0.5 | 0.5 | 1.5 | 1.5 |
| D1 | 5.0 | 0.51 | 113 | 5.65 | 135 | 8.08 | 825 | 0.5 | 0.5 | 1.5 | 1.5 |
| D2 | 5.0 | 0.51 | 114 | 5.70 | 163 | 7.26 | 870 | 0.5 | 0.5 | 2.0 | 1.5 |
| E1 | 7.0 | 2.12 | 122 | 8.54 | 135 | 12.0 | 850 | 0.5 | 0.5 | 1.5 | 1.5 |
| E2 | 7.0 | 2.12 | 118 | 8.26 | 163 | 12.1 | 850 | 0.5 | 0.5 | 1.5 | 1.5 |
| F1 | 5.0 | 1.52 | 120 | 6.00 | 135 | 9.02 | 900 | 0.5 | 0.5 | 1.5 | 2.5 |
| F2 | 5.0 | 1.52 | 122 | 6.10 | 163 | 9.81 | 1,050 | 0.5 | 0.5 | 1.5 | 1.5 |

EXAMPLE 7

Application of the diepoxide of Example 4 to wool

The product of Example 4 is applied to samples of 100% wool fabric (6.15 ounces per sq. yard in a plain weave) conditioned as in Examples 5–6. Processing and testing are identical to the aforesaid examples. Comparable improvements in the treated fabrics are obtained.

As the above examples and previous discussion indicate, the inventive compositions are advantageous in several respects. For example, the products can be prepared from available starting materials and are formed under relatively flexible reaction conditions. In addition, the products lend themselves to textile modification since they undergo their reactions, including polymerization, under relatively mild reaction conditions. This enables the novel diepoxide products to impart good dimensional stability to wool in economically feasible concentrations and the stabilized wool is durable to repeated laundering.

The metes and bounds of this invention in both its product and process aspects are best determined by reference to the claims which follow.

What is claimed is:

1. A process for dimensionally stabilizing a woolen fabric comprising applying to said fabric a solution in an inert solvent of:
   (1) a stabilizing amount of an epoxyalkyl carbamate of the structure:

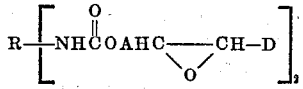

wherein
   A is a divalent alkylene radical containing up to 8 carbon atoms selected from the group consisting of straight-chain alkylene radicals and branched-chain alkylene radicals,
   D is selected from the group consisting of hydrogen and alkyl radicals of 1 to 8 carbon atoms, and
   R is a divalent organic radical of at least 12 carbon atoms selected from the group consisting of
   (a) linear polymers terminated on both ends by arylenecarbamoyl radicals of the formula

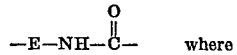

where E is phenylene, methylphenylene or dimethylphenylene, and
   (b) hydrocarbon radicals of 12 to 50 carbons, said stabilizing amount of epoxyalkyl carbamate being equal to about 0.5 to 10% by weight of the total weight of said fabric plus said epoxyalkyl carbamate, and (2) a polyamine selected from the group consisting of diethylene-triamine, triethylene-tetramine and tetra-ethylene-pentamine with the ratio of polyamine to epoxyalkyl carbamate being in the range of about 1:5 to 2:1 by equivalent weight; drying said fabric and then curing at a temperature above 100° C.

2. The process of claim 1 wherein the divalent radical R is a hydrocarbon radical.

3. The process of claim 2 wherein R, the hydrocarbon radical, is derived from a fatty moiety of at least 12 carbon atoms.

4. The process of claim 3 wherein R, the hydrocarbon radical, is —$CH_2GCH_2$—, wherein G is a dimerized fat radical of 14 to 48 carbon atoms.

5. The process of claim 2 wherein the epoxyalkyl carbamate applied to the fabric is of the structure:

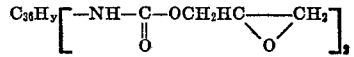

wherein the average value of y is approximately 66.

6. The process of claim 1 wherein R is a linear polymer represented by the formula:

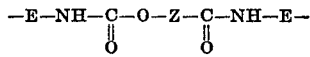

wherein
E is phenylene methylphenylene or dimethylphenylene radical and
Z is selected from the group consisting of:
   (a) polyalkyleneoxy (—$C_pH_{2p}O$—)$_n$ wherein
       p ranges between 3 and 6, and
       n is between 2 and 200 inclusive,
   (b) the chain of a linear polyester

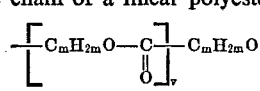

wherein
   m ranges between 2 and 10 inclusive, and
   v ranges between 2 and 80 inclusive,
   (c) the chain

wherein u ranges between 55 and 65 inclusive.

7. The process of claim 6 wherein:
Z is a polyalkyleneoxy $(C_pH_{2p}O)_n$, wherein
n ranges between 2 and 200 inclusive, and
p ranges between 3 and 6 inclusive 8. The process of claim 6 wherein
Z is the chain of a linear polyester:

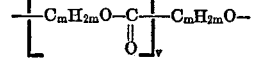

wherein
m ranges between 2 and 10 inclusive, and
v ranges between 2 and 80 inclusive.

9. The process of claim 6 wherein
Z is the polymer chain

wherein the average value of u ranges between 55 and 65 inclusive.

10. The process of claim 7 wherein the epoxyalkyl carbamate applied to the fabric is of the structure:

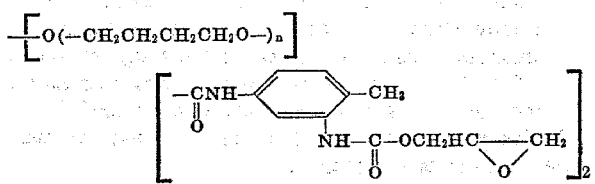

wherein the average value of $n$ ranges between 10 and 15 inclusive.

11. The process of claim 1 wherein the polyamine is tetraethylenepentamine.

References Cited

UNITED STATES PATENTS

| | | | | |
|---|---|---|---|---|
| 2,830,038 | 4/1958 | Pattison | 260— | 77.5 |
| 3,248,373 | 4/1966 | Barringer | 260— | 77.5 |
| 3,019,076 | 1/1962 | Pardo | | 8—128 |
| 3,279,882 | 10/1966 | Tesoro | | 8—127.6 |
| 3,558,264 | 1/1971 | Habib | | 8—127.6 |

DONALD LEVY, Primary Examiner

H. WOLMAN, Assistant Examiner

U.S. Cl. X.R.

8—128; 117—141